United States Patent [19]

Chan

[11] Patent Number: 4,617,567
[45] Date of Patent: Oct. 14, 1986

[54] AUTOMATIC MOTION COMPENSATION FOR RESIDUAL MOTION IN A SYNTHETIC APERTURE RADAR SYSTEM

[75] Inventor: Yuen-Kwok Chan, Seattle, Wash.

[73] Assignee: The Boeing Company, Seattle, Wash.

[21] Appl. No.: 656,143

[22] Filed: Sep. 28, 1984

[51] Int. Cl.$^4$ .............................................. G01S 13/90
[52] U.S. Cl. ...................................... 342/25; 342/196
[58] Field of Search ................. 343/7.4, 16 M, 5 CM, 343/5 DP, 5 FT, 5 NQ, 5 SA, 5 ST, 7 A, 7.7

[56] References Cited

U.S. PATENT DOCUMENTS

| | | | |
|---|---|---|---|
| 3,178,711 | 4/1965 | Case, Jr. ............................ | 343/16 M |
| 3,680,086 | 7/1972 | Valstar ............................. | 343/5 CM |
| 3,737,900 | 6/1973 | Vehrs, Jr. ........................... | 343/7 A |
| 3,976,998 | 8/1976 | Voles et al. ....................... | 343/5 CM |
| 3,992,710 | 11/1976 | Gabriele et al. ................. | 343/16 M |
| 3,993,994 | 11/1976 | Goggins ............................ | 343/5 CM |
| 4,034,370 | 7/1977 | Mims .................................. | 343/5 CM |
| 4,084,158 | 4/1978 | Slawsby ............................. | 343/5 CM |
| 4,134,113 | 1/1979 | Powell ............................... | 343/5 CM |
| 4,155,086 | 5/1979 | Blair ................................. | 343/7 A |
| 4,168,500 | 9/1979 | Brassaw ............................. | 343/7.7 |
| 4,168,501 | 9/1979 | Brassaw ............................. | 343/7.7 |
| 4,204,210 | 5/1980 | Hose ................................. | 343/6 R |
| 4,206,461 | 6/1980 | Pease ................................ | 343/5 DR |
| 4,292,634 | 9/1981 | Frosch .............................. | 343/5 CM |
| 4,359,732 | 11/1982 | Martin .............................. | 343/5 CM |
| 4,387,373 | 6/1983 | Longuemare, Jr. ............... | 343/5 CM |
| 4,471,357 | 9/1984 | Wu et al. .......................... | 343/5 CM |

*Primary Examiner*—Thomas H. Tarcza
*Assistant Examiner*—Bernarr Gregory
*Attorney, Agent, or Firm*—Bruce A. Kaser; Delbert J. Barnard

[57] ABSTRACT

In a SAR system (10) a method is provided for compensating for antenna AN residual motion relative to a motion sensor INS, wherein such residual motion causes phase corruption in a radar image produced by the SAR system. Residual motion compensation is provided by first correlating a received radar signal to a range line having a plurality of azimuth positions. Such signal is transformed into a frequency spectrum indicating the reflectivity of point reflectors at the various azimuth positions. Then, the range line is sampled for symmetric triplets of three sequential point reflectors positioned along the range line at a distance from each other corresponding to a specified frequency associated to a mode of residual vibration of the antenna. The amplitude and phase angle of said mode of the antenna residual motion may be obtained from such symmetric triplet(s).

4 Claims, 9 Drawing Figures

AUTOMATIC MOTION COMPENSATION FOR RESIDUAL MOTION IN A SYNTHETIC APERTURE RADAR SYSTEM

TECHNICAL FIELD

This invention pertains to synthetic aperture radar (SAR) systems. More particularly, the present invention pertains to a method for compensating for relative or residual motion between an antenna and a motion sensor in a SAR system, wherein such residual motion may cause phase corruption in a radar image.

BACKGROUND ART

In high resolution synthetic aperture radar (SAR) systems, it is critical to know the exact position (to within a small fraction of the carrier wave length) of the antenna during integration time in order to produce images of acceptable quality. This problem has been aptly described in U.S. Pat. No. 4,134,113 issued to Norman F. Powell on Jan. 9, 1979, and wherein such document is pertinent to the present invention.

Figure 1:
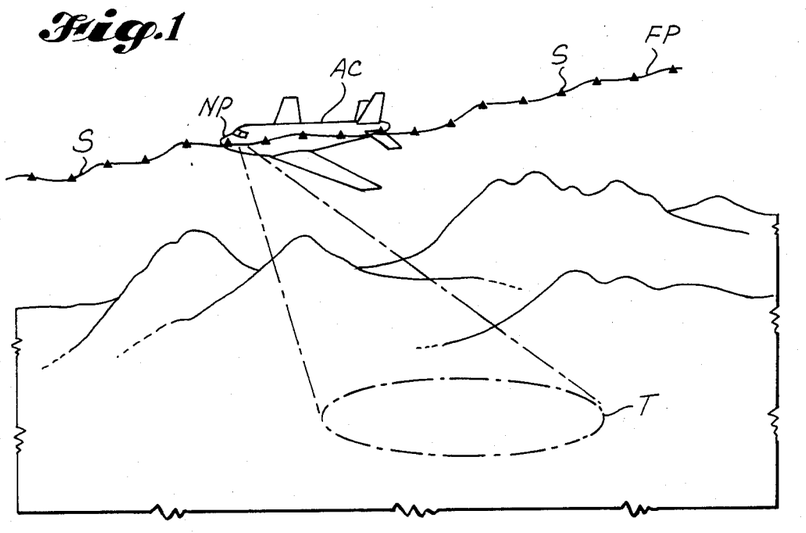
FIG. 1 is a pictorial view of an aircraft following a certain flight path and mapping terrain with a SAR system.
Figure 9:
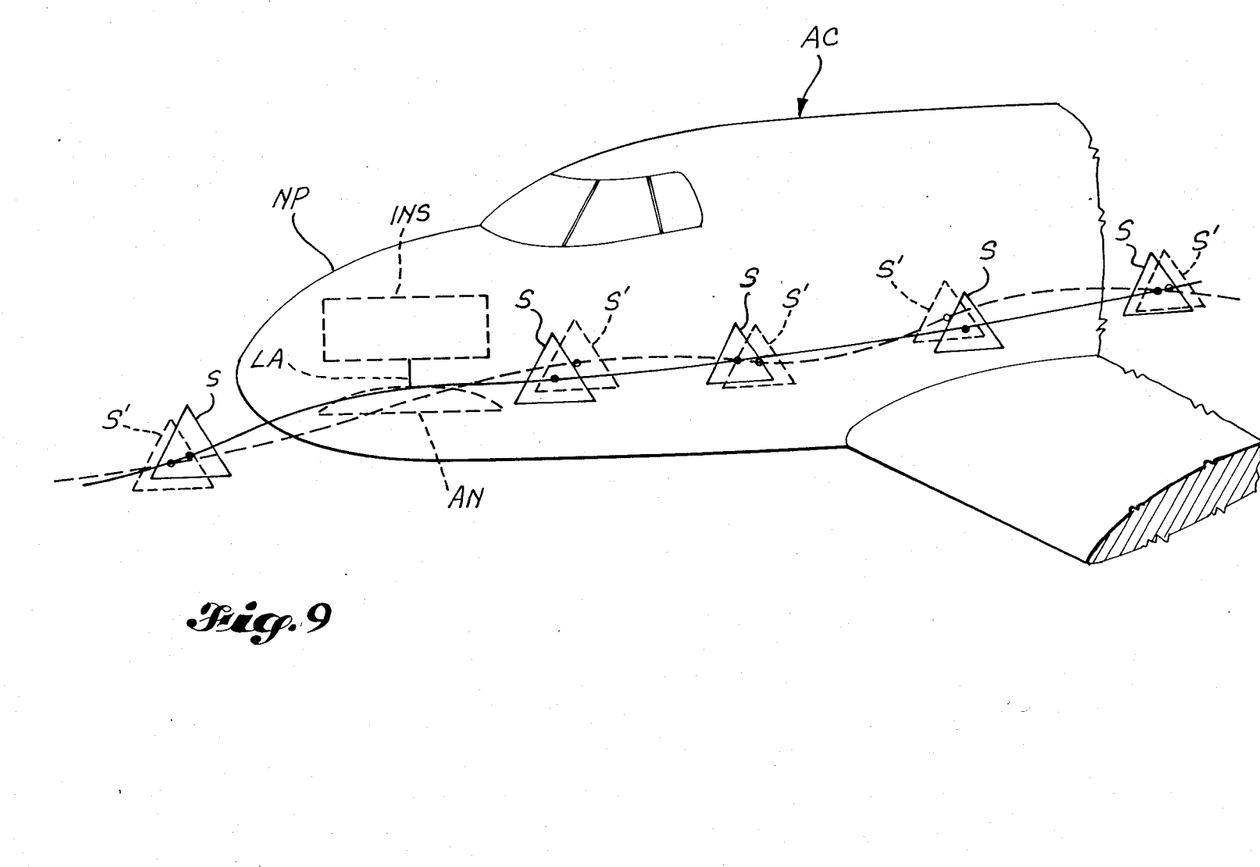
FIG. 9 is an enlarged fragmentary pictorial view of the nose portion of the aircraft shown in FIG. 1, and shows the physical separation of a SAR antenna from an inertial navigation system.

Briefly, and referring now to FIG. 1 in the drawings, a SAR system carried by an aircraft AC maps a target region T by transmitting and receiving radar signals at various sampling points S along the flight path FP of the aircraft. The SAR system may be positioned in the nose portion NP of the aircraft AC, for example. The SAR will typically require an inertial reference system INS for calculating the antenna AN position at the sampling points S. A problem with high resolution SAR systems is that the antenna AN may be physically separated from the inertial navigation system INS by a physical support, such as a lever arm LA, for example. The flexible modes of the lever arm render imprecise the data indicating the position of the antenna. What this means is that the antenna AN may deviate from its position as reported by the inertial navigation system INS. In other words, and referring now to FIG. 9, at every sampling point S in the flight path FP, the antenna AN may be displaced slightly to a position denotes S'. This may be referred to as antenna residual motion.

Residual motion of the antenna AN may cause corruption of the reflected radar signal received from the target region T. If such residual motion is not compensated for in some manner, the image produced by the SAR may be degraded to a point such that it would be of no practical use. A person skilled in the art would, of course, realize that the severity of antenna residual motion becomes a greater problem with increases in the desired resolution of the SAR.

The present invention provides a method for compensating for antenna residual motion in a SAR system.

DISCLOSURE OF THE INVENTION

In a SAR system mounted aboard an aircraft, the present invention provides a means for compensating for antenna residual motion between an antenna and a motion sensor in the SAR system. The instant invention correlates a received electronic signal to a SAR range line having a plurality of azimuth positions. The received electronic signal is transformed into a frequency spectrum that indicates the reflectivity of point reflectors at various azimuth positions across the range line. Typically, one point reflector is located at each azimuth position and each point reflector may be represented by a complex number having a certain magnitude and phase angle. The correlated signal is then sampled for symmetric triplets of three sequential point reflectors positioned along the range line at distances from each other that correspond to a particular frequency. The particular frequency, for example, may correspond to a mode of residual vibration of the SAR antenna.

Each sampled triplet will include a first point reflector, a second point reflector, and a third point reflector, all of which, as was explained above, are represented by complex numbers. The second point reflector is centrally positioned between the first and third reflectors. The triplet sampling includes calculating a first ratio of the first point reflector to the second point reflector. The sampling also includes calculating a second ratio of the third point reflector to the second point reflector. The difference between one of the calculated ratios, and the negative of the complex conjugate of the other of the calculated ratios is then compared. If such difference is below a preselected threshold value, then the three point reflectors are considered to be a symmetric triplet. In such case, then the one ratio and the negative of the complex conjugate of the other ratio are averaged together. Such average may be used to calculate the amplitude and phase angle of the antenna residual motion, wherein such calculated amplitude and phase angle are utilized to generate an antenna residual motion signal. The antenna residual motion signal is then combined with position signals generated by the SAR motion sensor to correct for residual antenna motion.

The average that is calculated for each symmetric triplet, in accordance with the description in the above paragraph, may be averaged for each average calculated for each symmetric triplet in a particular range line. Furthermore, such averaging may be performed for all symmetric triplets in all range lines of a particular SAR image.

BRIEF DESCRIPTION OF THE DRAWINGS

In the drawings, like reference numbers and numerals represent like parts throughout, and wherein.

BEST MODE FOR CARRYING OUT THE INVENTION

Figure 2:
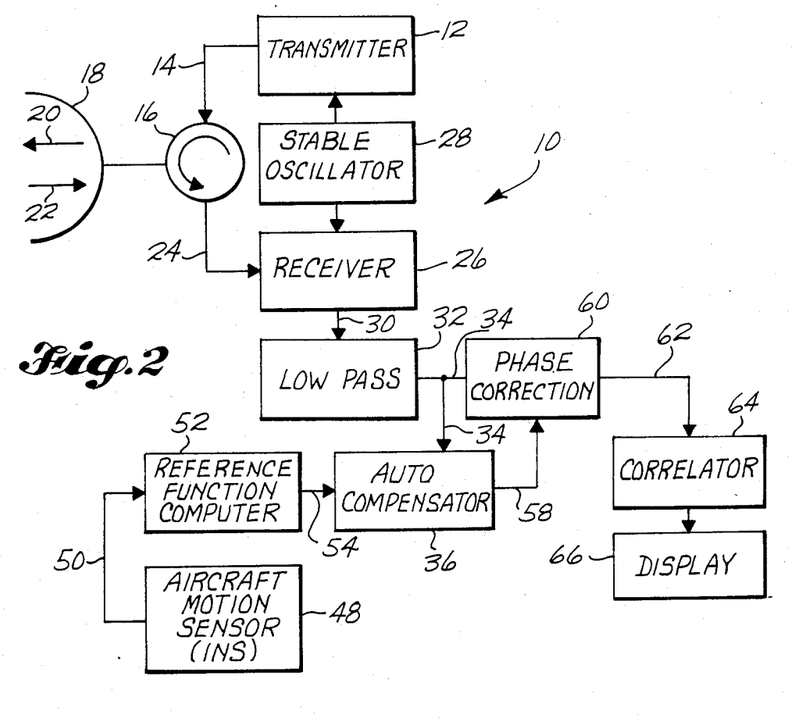
FIG. 2 is a schematic block diagram of a typical SAR system constructed in accordance with an embodiment of the present invention.

Referring now to the drawings, and first to FIG. 2, therein is shown generally by reference numeral 10 a synthetic aperture radar (SAR) system. The construction of the SAR system 10 is typical of most SAR systems. To briefly describe the system 10, a radar signal having a certain frequency is generated by a transmitter 12. The generated signal is sent (indicated generally by arrow 14) to a duplexer 16 where it is further transmitted to an antenna 18. The signal is then transmitted from the antenna 18 to a particular target region such as an area of terrain T (see FIG. 1). A portion of the signal is reflected off the terrain T back to the antenna 18. In FIG. 2, transmission of the signal by the antenna 18 to the target region T is indicated generally by arrow 20. Reception of the reflected signal is indicated generally by arrow 22. The received signal is transmitted back to the duplexer 16 which forwards the received signal (indicated generally by arrow 24) onward to a receiver 26. The SAR 10 may include a stable oscillator 28 that is provided for correlating the phase relationship between the signal that is generated by the transmitter 12, and the reflected signal that is processed by the receiver 26. After processing by the receiver 26, the reflected signal is then integrated with other received signals over time into range lines that generate an image of the target region T.

Figure 3:
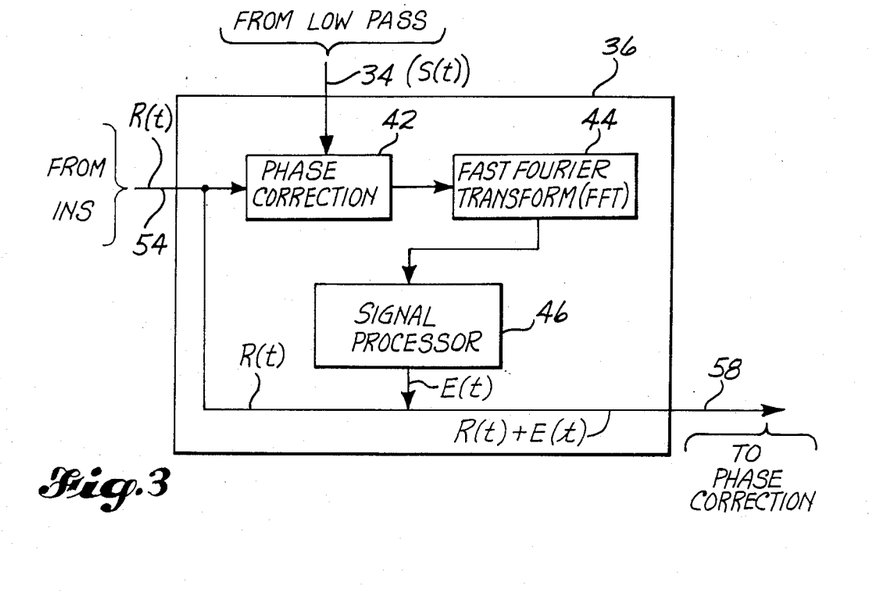
FIG. 3 is a schematic block diagram showing the production of a residual motion compensated antenna motion history signal.

In the typical SAR system, and in the system 10, the reflected signal received by the receiver 26 is an analog signal. For the sake of simplicity, the following description and discussion of the instant invention will be conducted with reference to only one range line and one corresponding signal. Range compression techniques which effectively yield a number of signals corresponding to a number of range lines are well-known in the art. Keeping this in mind, the analog signal is then mixed with a reference signal from the stable oscillator 28. This results in a sequence of digital pulses (indicated generally by arrow 30), each of which is represented by a complex number having a particular value that is constant within the pulse. This digital signal 30 is then transmitted to a low pass filter 32 which filters the signal 30 and slows the data rate. The low pass filtered digital signal (indicated generally by arrow 34) is to be motion compensated and correlated to produce an image of the target region T. Before this is done, however, the digital signal 34 is first processed to determine residual motion of the antenna 18. Referring now to FIG. 3, this process is schematically illustrated and will now be described.

An aircraft that carries the SAR system 10 will typically have an aircraft motion sensor or an inertial navigation system (INS) 48 that senses aircraft motion and position. It is well-known, of course, that the position of aircraft utilizing SAR systems must be known at all times. Such position information is used to calculate the position of the antenna 18 so that the transmitted and received radar signals 20, 22 may be properly integrated to produce an image of the target region T. Typically, the INS 48 sends a position signal (indicated generally by arrow 50) to a reference function computer 52. The reference function computer 52 then generates an antenna position signal 54 that is transmitted to an antenna residual motion compensator or an autocompensator 36.

The position signal 54 or position history signal is also indicated in FIG. 3 by the symbol R(t). The position signal R(t) as supplied from the reference function computer 52 does not, however, take into account antenna residual motion. The signal processor 46 generates such a component, which is indicated by the function E(t) in FIG. 3., and which is combined with the position signal R(t). In other words, the residual motion signal E(t) corrects the position signal R(t) to compensate for antenna residual motion. The combined signal R(t)+E(t) is then output from the autocompensator 36 and transmitted (indicated generally by arrow 58) to correct the phase of the output signal of the low pass filter 32 (see FIG. 2).

The output signal 58 of the autocompensator 36 may generally be referred to as an antenna motion history. This signal is combined with the digital signal 34 created by the low pass filter 32 by a phase correction portion 60 of the SAR 10. In the phase correction portion 60, the antenna motion history signal 58 is used to adjust the phase of the filtered signal 34. The amount of such adjustment may be indicated by the following equation:

$$\hat{S}(t) = S(t)e - j[R(t) + E(t)] \qquad \text{Eq. 1}$$

in which:
 $\hat{S}(t)$ is the motion compensated reflected signal of a range line;
 S(t) is the reflected signal before motion compensating of a range line; and
 [R(t)+E(t)] is the antenna motion history including an antenna residual motion history;
Proper units are assumed (as elsewhere in this description) so as to simplify this description.

After phase adjustment of the signal 34, the motion compensated signal (indicated generally by arrow 62) is transmitted to a signal correlator 64. The signal correlator 64 correlates the motion compensated signal 62 into a range line. A plurality of range lines may be combined to produce an image of the target region T on a display 66.

The SAR system 10 as thus described herein would be familiar to a person skilled in the art. Except for the autocompensator 36, a person skilled in the art would be familiar with the elements of the system 10, and their function. The need to have the autocompensator 36 to correct position information provided or signals by the INS 48 would be apparent to a person skilled in the art after having read this much of the instant description along with the Background Art Statement. Residual motion of the antenna 18 relative to the INS 48 causes corruption of an image produced on the display 66. The method by which the autocompensator 36 corrects the position signals from the INS 48 will now be explained.

In preferred form, the autocompensator 36 will be in the form of a digital data processor. The autocompensator 36 will have a phase correction portion 42 that first corrects the phase of the digital signal 34 by using the position history R(t) 54 as reported by the INS 48. The autocompensator 36 then uses a discrete fourier transform, and preferably a fast fourier transform (FFT), that transforms the phase corrected signal into a frequency spectrum, with the frequencies of such spectrum corresponding to the azimuth positions on a particular range line. This spectrum for the range line, which is digital in form, is then processed by a signal processor 46 in the autocompensator 36 to determine antenna residual motion.

Figure 4:
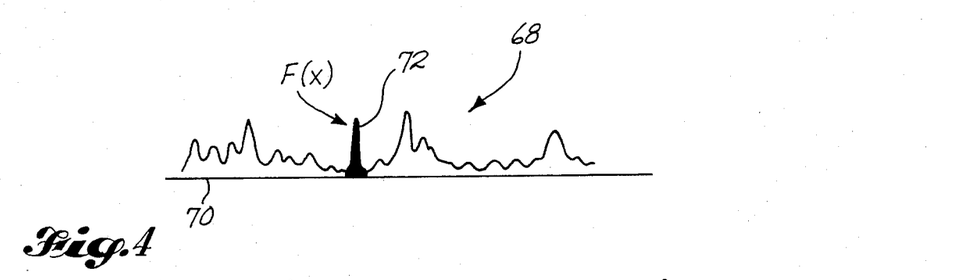
FIG. 4 is a graph showing the radar reflectivity of a range line pertinent to a SAR system.

Point reflectors in the target region situated at the various azimuth positions across the range line give rise to various intensities at various frequencies of the spectrum. This is generally illustrated in FIG. 4. In this FIG., the image 68 of a particular range line 70 is shown. That is, the image associated with the range line 70 is represented by the spectrum 68. Since there is a one to one correspondence between the reflectivity along the range line and the frequency spectrum associated with the range line, the terms range line and frequency spectrum may be used interchangeably. In the reflected scenes 68 there is shown a peak lobe 72 that represents one particular point reflector in the range line 70. Residual motion of the antenna 18 consists of one or more components that are sinusoidal. As a result of such sinusoidal motion components, each point reflector in the spectrum gives rise to a pair of spurious side lobes. This is illustrated schematically in FIG. 5, wherein the reflector 72 gives rise to spurious side lobes 74 and 76, respectively. The spurious side lobes 74, 76 are situated equidistant from the main or peak lobe 72 at a distance of $\pm\theta$ Hertz (Hz), with $\theta$ corresponding to the frequency of the particular sinusoidal residual motion component of the antenna that is being considered by the autocompensator 36. For example, such sinusoidal component may be defined by the following equation:

$$E(t) = Z \sin(\theta t + A) \quad \text{Eq. 2}$$

in which:

E(t) is the antenna residual motion component being considered;

Z is the amplitude of the residual motion component;

$\theta$ is the frequency of the residual motion component; and

A is the phase angle of the residual motion component;

Therefore, if the frequency of a sinusoidal component of the residual motion is specified, and if the amplitude "Z" and the phase "A" can be determined, then the antenna residual motion component signal can be generated to correct the position signal R(t) received from the INS 48. The frequencies of prevailing components of the antenna residual motion may be estimated by measurement. It has been my discovery that the symmetrical reflectivity relationship between the spurious side lobes 74, 76 and the main lobe 72 is common to all reflectors in all range lines, subject to "noise" which can be filtered out. Hence, such symmetrical relationship may be used to calculate the need amplitude "Z" and phase "A" of the antenna residual motion.

Figure 5:
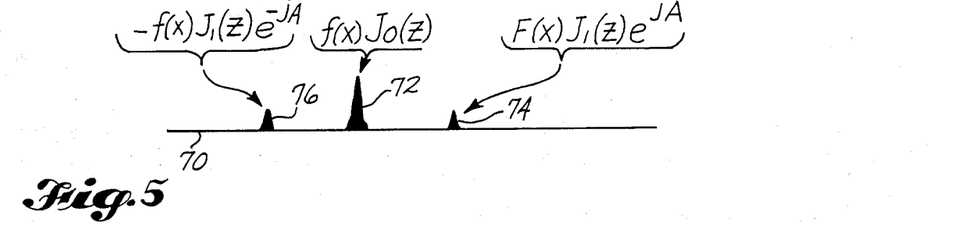
FIG. 5 is a graph showing a corrupted image of a point reflector in the range line of FIG. 4, and showing spurious side lobes that would result from a sinusoidal component of the residual antenna motion if no other reflectors were present in the range line.
Figure 6:
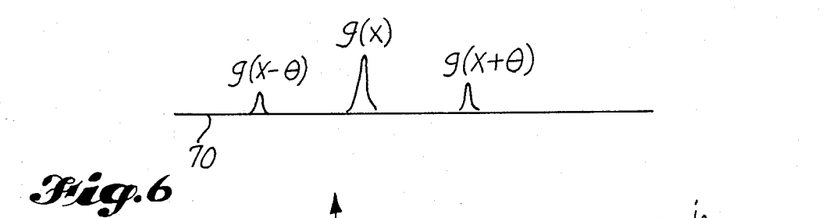
FIG. 6 is a graph showing the relationship between the intensities of the peak and spurious side lobes of FIG. 5 in the presence of other reflectors in the range line.

Consider the range line 70 shown in FIGS. 4–6. Because of sinusoidal phase corruption due to antenna residual motion, a point reflector situated at an azimuth position X along the range line may give rise to a main lobe with intensity f(x) that is reduced by a factor equal to $J_0(Z)$ where $J_k$ is a kth order Bessel function. This results in an intensity of $f(x)J_0(Z)$, wherein f(x) would be the intensity if no phase corruption were present. The point reflector would also give rise to a pair of spurious side lobes positioned at $X \pm \theta$, respectively, having an intensity of $f(x)J_1(Z)e^{jA}$ and $-f(x)J_1(Z)e^{-jA}$, respectively.

Referring now to FIG. 6, let the expression of g(x) be used to denote the phase corrupted image resulting from antenna residual motion. If only one reflector having a reflectivity f(x) is present in the range line at position X, then:

$$g(x) = f(x)J_0(Z) \quad \text{Eq. 3}$$

$$g(x+\theta) = f(x)J_1(Z)e^{jA} \quad \text{Eq. 4}$$

$$g(x-\theta) = -f(x)J_1(Z)e^{-jA} \quad \text{Eq. 5}$$

Figure 7:
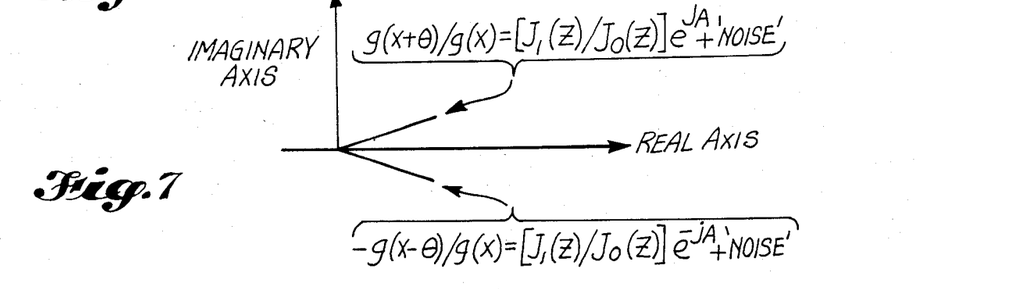
FIG. 7 is a graph of the ratios of the intensities of the side lobes to the intensity of the peak lobe of FIG. 6.

If this is the case, then:

$$g(x+\theta)/g(x) = [J_1(Z)/J_0(Z)]e^{jA} \quad \text{Eq. 6}$$

$$-g(x-\theta)/g(x) = [J_1(Z)/J_0(Z)]e^{-jA} \quad \text{Eq. 7}$$

and Eq. 6 and 7 represent phasors that are complex conjugates of each other. In other words, the sums of Eq. 6 and the negative of the complex conjugate of Eq. 7 will be zero, or within a threshold value that is approximately equal to zero. What this means is:

$$[g(x+\theta)/g(x) + [g(x-\theta)/g(x)]^* \approx 0 \quad \text{Eq. 8}$$

wherein, as elsewhere in this description, an asterix denotes a complex conjugate. Eq. 8 is graphically illustrated in FIG. 7, wherein this Fig. includes an imaginary and a real axis for complex numbers.

The values of Z and A in Eq. 2 may be estimated from the following equation:

$$[J_1(Z)/J_0(Z)]e^{jA} = \tfrac{1}{2}\{[g(x+\theta)/g(x)] - [g(x-\theta)/g(x)]^*\} \quad \text{Eq. 9}$$

In practice, because of the presence of other reflectors, the symmetry relationship in Eq. 9 is subject to a noise term. This is generally indicated in FIG. 7. However, such noise term can be averaged out even if it is of a magnitude such that it cannot be ignored when compared to the ratios of Eq. 9. Such averaging can be accomplished because of a large number of reflectors in the scene, and the correspondingly large numbers of symmetric point reflector samples for Eq. 9.

To summarize, the range line 70 may be searched for triplets of point reflectors that approximately satisfy the relationship in Eq. 8 to produce an amplitude Z and a phase angle A from Eq. 9. The amplitude and phase angle may then be substitued back into Eq. 2 to provide the antenna residual motion. Typically, a plurality of triplets of symmetric lobes 72, 74, 76 satisfying Eq. 8 would be found for each range line in a SAR image. Therefore, the values calculated from Eq. 9 may be calculated for each triplet in the range line and averaged to eliminate noise for the purpose of obtaining better estimates of Z and A.

Figure 8:
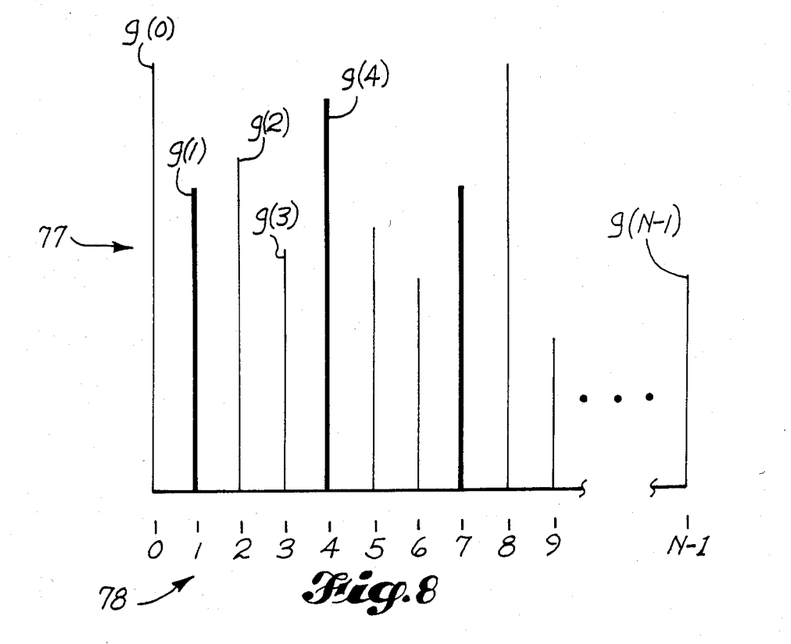
FIG. 8 is a graph of a range line and symbolically shows a plurality of point reflectors distributed along the range line at a plurality of azimuth positions, with the point reflectors being represented by complex numbers.

As was mentioned above, calculations of the amplitude Z and the phase angle A are made in the above manner by the signal processor 46. Referring now to FIG. 8, the operation of the signal processor 46 will be briefly described. In FIG. 8, there is shown an image of a plurality of point reflectors 77 for a range line 78. The range line 78 has a certain number of azimuth positions labeled N. The number of azimuth positions N may correspond to the number of pixels in a sweep line of a video display screen, for example. It may be assumed that the point reflector intensities g(x) 77 have been obtained through the fast fourier transform portion (FFT) 44 of the autocompensator 36. By way of example, and for brevity of notation, assume that units have been chosen so that frequencies X in the spectrum 78 are in increments of 1 Hz. Further, assume a characteristic mode of the antenna residual motion to be $\theta$ Hz. It is possible to "tune" the autocompensator 36 to this characteristic frequency ($\theta$ Hz) by sweeping along the range line 78, i.e., examining the triplet $g(x)$, $g(x-\theta)$, $g(x+\theta)$ for each $x=0, 1 \ldots, N-1$, wherein a negative frequency $-\eta$ is interpreted as $N-\eta$. Thus the triplet $g(-\theta)$, $g(0)$, $g(\theta)$ is first examined, then the triplet $g(1-\theta)$, $g(1)$, $g(1+\theta)$, and so on. In terms of Eq. 8, the ratios $g(-\theta)/g(0)$ and $g(\theta)/g(0)$ are first formed. If $g(\theta)/g(0)+[g(-\theta)/g(0)]^*$ is nearly zero (this is Eq. 8 with x equal to zero), then a symmetric triplet with a small noise term has been found. Therefore, according to Eq. 9, an estimate of $[J_1(Z)/J_0(Z)]e^{jA}$ is provided by $\frac{1}{2}\{g(\theta)/g(0)-[g(-\theta)/g(0)]^*\}$. At this point, a first estimate of Z and A may be obtained from the left hand side of Eq. 9. The average of the ratios may then be stored by the signal processor 46, which then samples the next triplet in sequence, i.e., $g(1-\theta)$, $g(1)$, $g(1+\theta)$, and makes the same analysis. If the next triplet satisfies the relationship set forth in Eq. 8, then the signal processor 46 combines the approximate ratios in the same manner as set forth in Eq. 9, thereby obtaining an estimate of $[J_1(Z)/J_0(Z)]e^{jA}$. Furthermore, in preferred form, the signal processor 46 then averages the estimate from the second triplet with that from the first provided that, of course, both are symmetric triplets. The signal processor 46 continues sampling triplets sequentially along the range lines 78 in this manner until triplets for all of the azimuth positons (N) have been examined. Whenever a triplet is found to have the appropriate symmetry relationship (as set forth in Eq. 8), the combined ratios may be further averaged with the previous estimates of $[J_1(Z)/J_0(Z)]e^{jA}$. In this manner, better estimates of amplitude Z and phase angle A may be calculated over the range line 78, and further, for succeeding range lines in the image. It should be noted, however, and a person skilled in the art would realize that not all triplets sampled in the range line 78 will be symmetrical. For example, assuming $\theta=3$ by way of illustration, while the triplet centered at $x=4$ in FIG. 8 will probably yield a valid estimate of Z and A, that triplet which is centered at $x=6$ will probably not do so. It should be appreciated that subsequent to, or simultaneously with, the treatment of a particular characteristic frequency of the antenna residual motion, other characteristic frequencies of residual motion can be treated in exactly the same manner.

The signal processor 46 will typically be a data processor that has certain software requirements to fulfill the above-described sampling function. Summarized, the software requirements are:

1. To receive a reflected digital signal for a particular range line in an SAR system.
2. To fourier transform, preferably fast fourier transform, (FFT), that reflected signal into a digital frequency spectrum.
3. Sampling triplets of point reflectors across the range line for each azimuth position.
4. Determining if there is symmetry in the triplets so that the ratio of the third and second point reflectors is approximately equal to the negative complex conjugate of the ratio of the first and second point reflectors in each triplet, or vice versa. It is to be appreciated that a thresholding operation is involved herein utilizing a preselected threshold value.
5. Combining the ratios for each triplet having the proper symmetry relationship in paragraph 4 above, to obtain the amplitude and phase angle of antenna residual motion through the use of Bessel functions.

While an exemplary embodiment of the invention has been described above and shown in the accompanying drawings, it is to be understood that such embodiment is merely for illustrative purposes only. Obviously, certain changes may be made to the invention without departing from the spirit and scope thereof. It is intended that the scope of the invention shall be limited only by interpreting the appended claims which will follow in accordance with the well-established doctrines of patent claim interpretation.

What is claimed is:

1. In a SAR system that receives reflections of radar signals from a target region, wherein such signals are combined with position signals from a motion sensor indicating antenna position, with the reflected signals and the position signals being integrated into range lines that may be combined to form a radar image, and wherein there may be residual motion between the antenna and the motion sensor, a method of correcting the position signals from the motion sensor to compensate for antenna residual motion that may cause phase corruption in the radar image, the method comprising:
   a. transforming a received radar signal into a range line having a plurality of azimuth positions, and transforming said received signal into a frequency spectrum indicating the reflectivity of point reflectors at said azimuth positions, wherein one point reflector is located at each azimuth position, and wherein each point reflector is represented by a complex number having a certain magnitude and phase angle;
   b. Sampling the range line for a symmetric triplet of three sequential point reflectors positioned at a distance from each other corresponding to a frequency, wherein said frequency corresponds to a mode of residual vibration of the antenna, and wherein said triplet includes a first point reflector, a second point reflector, and a third point reflector, all of which are represented by complex numbers, with said second point reflector being centrally positioned between said first and third point reflectors, and wherein such sampling includes calculating a first ratio of the complex number indicating reflectively of the first point reflector to the complex number indicating reflectivity of the second point reflector, and calculating a second ratio of the complex number indicating reflectivity of the third point reflector to the complex number indicating reflectivity of the second point reflector;
   c. Comparing the difference between one of said ratios calculated in step (b) above, and the negative of the complex conjugate of the other of said ratios calculated in step (b), wherein if said difference is below a preselected threshold value, then said three point reflectors are considered to be a symmetric triplet;
   d. Averaging the one of said ratios calculated in step (b) with the negative of the complex conjugate of the other of said ratios if said three point reflectors are considered to be a symmetric triplet;
   e. Calculating the amplitude and phase angle of the antenna residual motion from the averaged ratios in step (d) above, and generating an antenna residual motion signal therefrom; and f. Combining the residual motion signal generated in step (e) above with the position signals from the motion sensor, to correct for antenna residual motion between the motion sensor and the antenna.

2. The method in accordance with claim 1, including sampling said range line for a plurality of triplets, and averaging the averages calculated in step (d) of claim 1 for all symmetric triplets.

3. The method in accordance with claim 1, wherein said SAR system produces an image comprising a plurality of range lines, and including
sampling all of said range lines for triplets, and averaging the averages calculated in step (d) of claim 1 for all symmetric triplets in all of said range lines.

4. In a SAR system that receives reflections of radar signals from a target region, wherein such signals are combined with position signals from a motion sensor indicating antenna position, with the reflected signals and the position signals being integrated into range lines that may be combined to form a radar image, and wherein there may be residual motion between the antenna and the motion sensor, a method of correcting the position signals from the motion sensor to compensate for antenna residual motion that may cause phase corruption in the radar image, the method comprising:
   a. transforming a received radar signal into a range line having a plurality of azimuth positions, and transforming said received signal into a frequency spectrum indicating the reflectivity of point reflectors at said azimuth positions, wherein one point reflector is located at each azimuth position, and wherein each point reflector is represented by a complex number having a certain magnitude and phase angle;
   b. Sampling the range line for a symmetric triplet of three sequential point reflectors positioned at a distance from each other corresponding to a frequency, wherein said frequency corresponds to a mode of residual vibration of the antenna, and wherein said triplet includes a first point reflector, a second point reflector, and a third point reflector, all of which are represented by complex numbers, with said second point reflector being centrally positioned between said first and third point reflectors, and wherein such sampling includes calculating a first ratio of the complex number indicating reflectivity of the first point reflector to the complex number indicating reflectivity of the second point reflector, and calculating a second ratio of the complex number indicating reflectivity of the third point reflector to the complex number indicating reflectivity of the second point reflector;
   c. Comparing the difference between one of said ratios calculated in step (b) above, and the negative of the complex conjugate of the other of said ratios calculated in step (b), wherein if said difference is below a preselected threshold value, then said three point reflectors are considered to be a symmetric triplet;
   d. Calculating the amplitude and phase angle of the antenna residual motion from at least one of said ratios or the said negatives of the complex conjugates of the other of said ratios in step (c) above, only if said three point reflectors are considered to be symmetric, and generating an antenna residual motion signal from such calculated amplitude and phase angle; and
   e. Combining the residual motion signal generated in step (d) above with the position signals from the motion sensor, to correct for antenna motion between the motion sensor and the antenna.

* * * * *

UNITED STATES PATENT AND TRADEMARK OFFICE
CERTIFICATE OF CORRECTION

PATENT NO. : 4,617,567
DATED : October 14, 1986
INVENTOR(S) : Yuen-Kwok Chan

It is certified that error appears in the above-identified patent and that said Letters Patent are hereby corrected as shown below:

Column 1, lines 41 and 42, "denotes" should be -- denoted --.

Column 5, line 53, "need" should be -- needed --.

Column 6, line 22, insert -- ] -- after the second "x".

Claim 1, column 8, line 47, "reflectively" should be -- reflectivity --.

Signed and Sealed this

Twenty-fourth Day of February, 1987

Attest:

DONALD J. QUIGG

Attesting Officer

Commissioner of Patents and Trademarks